(12) United States Patent
Pereg et al.

(10) Patent No.: US 10,242,670 B2
(45) Date of Patent: Mar. 26, 2019

(54) SYNTACTIC RE-RANKING OF POTENTIAL TRANSCRIPTIONS DURING AUTOMATIC SPEECH RECOGNITION

(71) Applicant: Intel Corporation, Santa Clara, CA (US)

(72) Inventors: Oren Pereg, Amikam (IL); Moshe Wasserblat, Maccabim (IL); Jonathan Mamou, Jerusalem (IL); Michel Assayag, Shoham (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/272,078

(22) Filed: Sep. 21, 2016

(65) Prior Publication Data

US 2018/0082680 A1   Mar. 22, 2018

(51) Int. Cl.
*G10L 15/00* (2013.01)
*G10L 15/197* (2013.01)
*G10L 15/02* (2006.01)
*G06F 17/27* (2006.01)
(Continued)

(52) U.S. Cl.
CPC .......... *G10L 15/197* (2013.01); *G06F 17/274* (2013.01); *G10L 15/02* (2013.01);
(Continued)

(58) Field of Classification Search
CPC ............... G06F 17/2785; G06F 17/274; G06F 17/30746; G10L 15/22; G10L 15/30;
(Continued)

(56) References Cited

U.S. PATENT DOCUMENTS 5,839,106 A * 11/1998 Bellegarda .......... G10L 15/1815
704/243
2005/0065789 A1   3/2005 Yacoub et al.
(Continued)

FOREIGN PATENT DOCUMENTS

WO   2018057427   3/2018

OTHER PUBLICATIONS

"International Application Serial No. PCT/US2017/051823, International Search Report dated Dec. 15, 2017", 3 pgs.
(Continued)

*Primary Examiner* — Vu B Hang
(74) *Attorney, Agent, or Firm* — Schwegman Lundberg & Woessner, P.A.

(57) ABSTRACT

A system and method for syntactic re-ranking of possible transcriptions generated by automatic speech recognition are disclosed. A computer system accesses acoustic data for a recorded spoken language and generates a plurality of potential transcriptions for the acoustic data. The computer system scores the plurality of potential transcriptions to create an initial likelihood score for the plurality of potential transcriptions. For a particular potential transcription in the plurality of transcriptions, the computer system generates a syntactical likelihood score. The computer system creates an adjusted score for the particular potential transcription by combining the initial likelihood score and the syntactic likelihood score for the particular potential transcription.

20 Claims, 7 Drawing Sheets

(51) Int. Cl.
*G10L 15/18* (2013.01)
*G10L 15/19* (2013.01)
*G10L 15/20* (2006.01)
*G10L 15/22* (2006.01)

(52) U.S. Cl.
CPC .......... *G10L 15/1822* (2013.01); *G10L 15/19* (2013.01); *G10L 15/20* (2013.01); *G10L 15/22* (2013.01)

(58) Field of Classification Search
CPC ....... G10L 15/265; G10L 15/16; G10L 15/08; G10L 15/197; G10L 25/30; G10L 15/142; G10L 15/144; G10L 15/183; G10L 15/07; G10L 15/20; G10L 15/02; G10L 21/0208; G10L 25/78; G10L 25/87; G10L 15/26; G10L 15/14
See application file for complete search history.

(56) References Cited

U.S. PATENT DOCUMENTS

| | | |
|---|---|---|
| 2008/0071536 A1 | 3/2008 | Nagashima |
| 2014/0067379 A1 | 3/2014 | Kim et al. |
| 2014/0330558 A1 | 11/2014 | Dahlmeier et al. |
| 2015/0012271 A1* | 1/2015 | Peng ................. G10L 15/08 704/235 |
| 2015/0161109 A1* | 6/2015 | Talbot ................. G06F 17/271 704/2 |

OTHER PUBLICATIONS

"International Application Serial No. PCT/US2017/051823, Written Opinion dated Dec. 15, 2017", 7 pgs.

* cited by examiner

US 10,242,670 B2

SYNTACTIC RE-RANKING OF POTENTIAL TRANSCRIPTIONS DURING AUTOMATIC SPEECH RECOGNITION

TECHNICAL FIELD

Embodiments described herein generally relate to automatic speech recognition.

BACKGROUND

Electronic devices are increasingly integrated into daily life. However, electronic devices to function and interact with human users effectively, the ability to understand and respond to spoken language is very important. Unfortunately, automated speech recognition has proven to be a very difficult task for computers to perform.

In the past, computers and other devices that use microelectronics have sought to interpret natural spoken language using acoustic models (which match sounds detected to known words) and language models, which allow a device to probabilistically rate the likelihood of a number of possible candidate words or phrases. Additional improvements to natural language processing would be useful in furthering the ability of these devices to interact with their human users.

DETAILED DESCRIPTION

Figure 1:
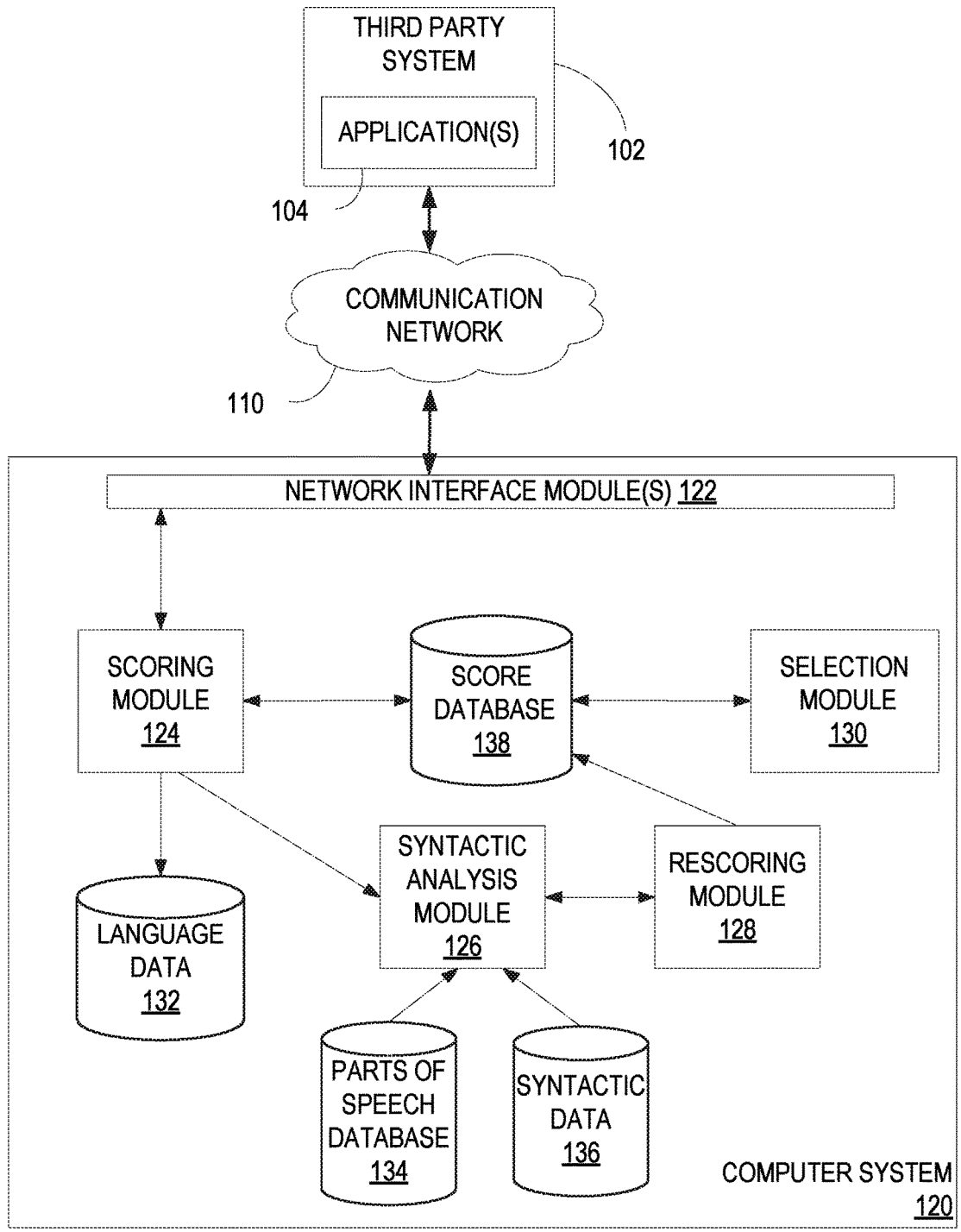
FIG. 1 is a block diagram depicting a computer system, in accordance with some example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some example embodiments, in addition to acoustic and language n-gram modeling, it would be beneficial to connect additional information to allow the computer system to more accurately generate text transcriptions for natural spoken language. In some example embodiments, the computer system uses syntactic information to re-score a plurality of potential transcription candidates in a way that more accurately reflects actual spoken language. In this way, the accuracy of a natural language processor in a computer system is improved.

The computer system receives acoustic information for natural spoken language and a request to provide a transcription. In some example embodiments, the acoustic information is recorded by a microphone input on the computer system.

Using an acoustic model, the computer system maps the received acoustic information to one or more candidate transcriptions. For example, the computer system has a model that takes sound file data as input and outputs likely word or phrase matches. In some example embodiments, each candidate word or phrase has a likelihood associated with it. Using the output from the acoustic models, the computer system may then analyze each candidate using an n-gram language model.

In some example embodiments, an n-gram language model is generated using a large corpus of text in the intended language. For each group of n-words (where n is the number of words in each group of words considered), the model generates a likelihood that those words would be found together. Using these likelihoods, and the likelihood generated by the acoustic models, the computer system scores all the potential transcriptions and then ranks them according to their scores. These initial likelihood scores and rankings are stored at the computer system.

In some example embodiments, the computer system then analyzes each (or at least some) of the candidate transcriptions based on a syntactic analysis of the text included in the candidate transcriptions.

Conducting this syntactic analysis includes, first, analyzing each word and assigning a tag indicating one or more parts of speech to the word (or potentially small phrase). For example, different parts of speech include verbs, nouns, adjectives, adverbs, pronouns, prepositions, and so on. In a very simple example, the computer system stores a table that maps each word or phrase to a specific part of speech. In other example embodiments, a given word or phrase has more than one potential part of speech (e.g., "paste" is sometimes a noun and sometimes a verb). In some example embodiments, the table lists a probability for each potential part of speech (e.g., "paste" is a verb 75% of the time and a noun 25% of the time).

In some example embodiments, the computer system parses each candidate transcription syntactically to identify phrases within the candidate transcription texts. In some example embodiments, the computer system has a grammar model of syntactic structure for a particular language. Using the grammar model, the computer system starts identifying the parts of a phrase or sentence.

For example, the syntactic structure for a given phrase or sentence begins with a source (S) and then identifies of the parts of speech needed to make a phrase based on a stored grammar. For example, for English, a simple grammar is as stated:

S=subject (N)— —verb (V)— —Object (N)

In another example, the computer system identifies phrases using a machine learning based syntactic parser. In this example, a syntactic parser would be trained using a set of pre-parsed language data.

Using the previous applied tags that indicate a part of speech for a particular word or phrase, the computer system identifies words or phrases that are the subject, the verb, and the object of the verb. For example, if the candidate transcription is "the burglar robbed the apartment", "the" is tagged as a determiner (D), "burglar" and "apartment" are tagged as nouns, and "robbed" is tagged as a verb. Then the parser identifies "burglar" as the subject (based at least in part on that fact that it is tagged as a noun and based also on its position in the sentence or phrase). Similarly, "robbed" is identified as a verb and "apartment" is determined to be the object.

In some example embodiments, once the sentence has been parsed syntactically, the computer system creates a syntactic parse tree for the syntactical parsing information. Once the syntactic parse tree is generated, the computer system extracts one or more features from the syntactic parse tree. Features include, but are not limited to, node types, relation types, the number of siblings per node, and so on. Using these extracted features, the computer system generates a syntactic likelihood score for at least some of the candidate transcriptions using a syntactic coherency model.

Once syntactic likelihood scores have been generated for each candidate transcription, the syntactic scores are combined with the existing probability scores (e.g., that were based on acoustic models and language modes) to re-rank or rescore the candidate transcriptions. In this way, a different most likely candidate transcription will be determined to be the best (or most likely) transcription for a given section of recorded audio.

By combining syntactic analysis with other speech recognition systems, the systems performing this automatic speech recognition perform more efficiently (e.g., by spending less time on unlikely candidates) and with increased performance, where performance is determined by the word error rate that occurs when transcribing the audio.

FIG. 1 is a block diagram depicting a computer system 120, in accordance with some example embodiments. The computer system 120 includes a network interface module(s) 122, a scoring module 124, and a syntactic analysis module 126. The computer system 120 also is connected to one or more third-party systems 102. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some example embodiments, as shown by way of example in FIG. 1, the computer system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a computer system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-component type of architecture, the various example embodiments are by no means limited to this architecture.

As shown by way of example in FIG. 1, the computer system 120 includes a network interface module(s) (e.g., a web server) 122, which receives data and/or requests from various third-party systems 102, and communicates data back to the appropriate third-party systems 102 when appropriate. For example, the network interface module(s) 122 receives a request to provide a transcription for a particular audio file or other sound-based recording. In other example embodiments, the computer system 120 requests syntactic or grammar related information from a third-party system 102.

In some example embodiments, the application logic components of the computer system 120 further include a scoring module 124, a syntactic analysis module 126, a rescoring module 128, and a selection module 130.

As shown by way of example in FIG. 1, the data components include language data 132 (e.g., information about likelihood of n-grams occurring in a given language), a parts of speech database 134 for storing parts of speech data (e.g., data that associates particular words or phrases with one or more parts of speech), syntactic data 136 (e.g., information about the syntactic structure of a given language), and a score database 138 for storing a likelihood score for a plurality of candidate transcriptions (e.g., one or more different texts that have a likelihood of being an accurate transcription of a given audio information). It should be noted that in this application, "database" is used to refer to any method or type of data storage or retention and is not limited to formal databases. Thus, any data structure or format may be used to hold the data in language data 132, parts of speech database 134, syntactic data 136, and score database 138.

The scoring module 124 receives or accesses a request to process a given part of audio data (e.g., a sound file) and uses acoustic models and n-gram language models (generated from language data 132) to generate a plurality of transcription candidates. As noted above, transcription candidates include text that the computer system 120 identifies as a possibly accurate transcription of the sound data based on an evaluation using acoustic and language models.

Each of the plurality of transcription candidates is given an initial likelihood score by the scoring module 124 based on the acoustic and n-gram language analysis. In some example embodiments, the initial likelihood scores are stored in the score database 138.

The syntactic analysis module 126 parses the candidate transcriptions and assigns each word or phrase at least one part of speech tag based on information in the parts of speech database 134. For example, for each word, the syntactic analysis module 126 looks up the word in a table in the parts of speech database 134 to identify one or more parts of speech associated with the word. The word is then tagged with that part of speech. In some example embodiments, the syntactic analysis module 126 also parses the candidate transcriptions, using the parts of speech tags, to identify syntactic phrases or sentences in each candidate transcription and identify relationships between the words.

For example, if a noun is identified as the object of the sentence, it is associated with the identified verb. Similarly, the verb is identified with a subject of the verb, if any. Thus, each word is syntactically connected to other words. The syntactic analysis module 126 then builds a syntactic tree out of the identified relationships. In some example embodiments, the tree is hierarchical.

The syntactic analysis module 126 transfers the syntactic tree to the rescoring module 128. The rescoring module 128 uses the information in the syntactic tree to generate a syntactic likelihood score, which represents the likelihood that a candidate transcription is the correct transcription based on the degree to which it (or its components) match the expected syntactic structure of the language which is being processed. Thus, a deviation from expected syntactical structure results in a lower syntactic likelihood score and correct syntax results in a higher score. In some example embodiments, simpler syntax may be scored higher than more complicated and/or convoluted syntax.

The rescoring module 128 accesses the initial likelihood score for each candidate transcription from the score database 138. The rescoring module 128 then adjusts the initial score based on the syntactical likelihood score.

The selection module 130 then accesses the updated likelihood score for one or more (or all) candidate transcriptions. The selection module 130 then selects the transcription with the highest likelihood value and, as needed, transfers the selected transcription to the requesting party (e.g., if a third-party system 102 requested a transcription of an audio file, the selected transaction would be transferred to the requesting third party).

Figure 2:
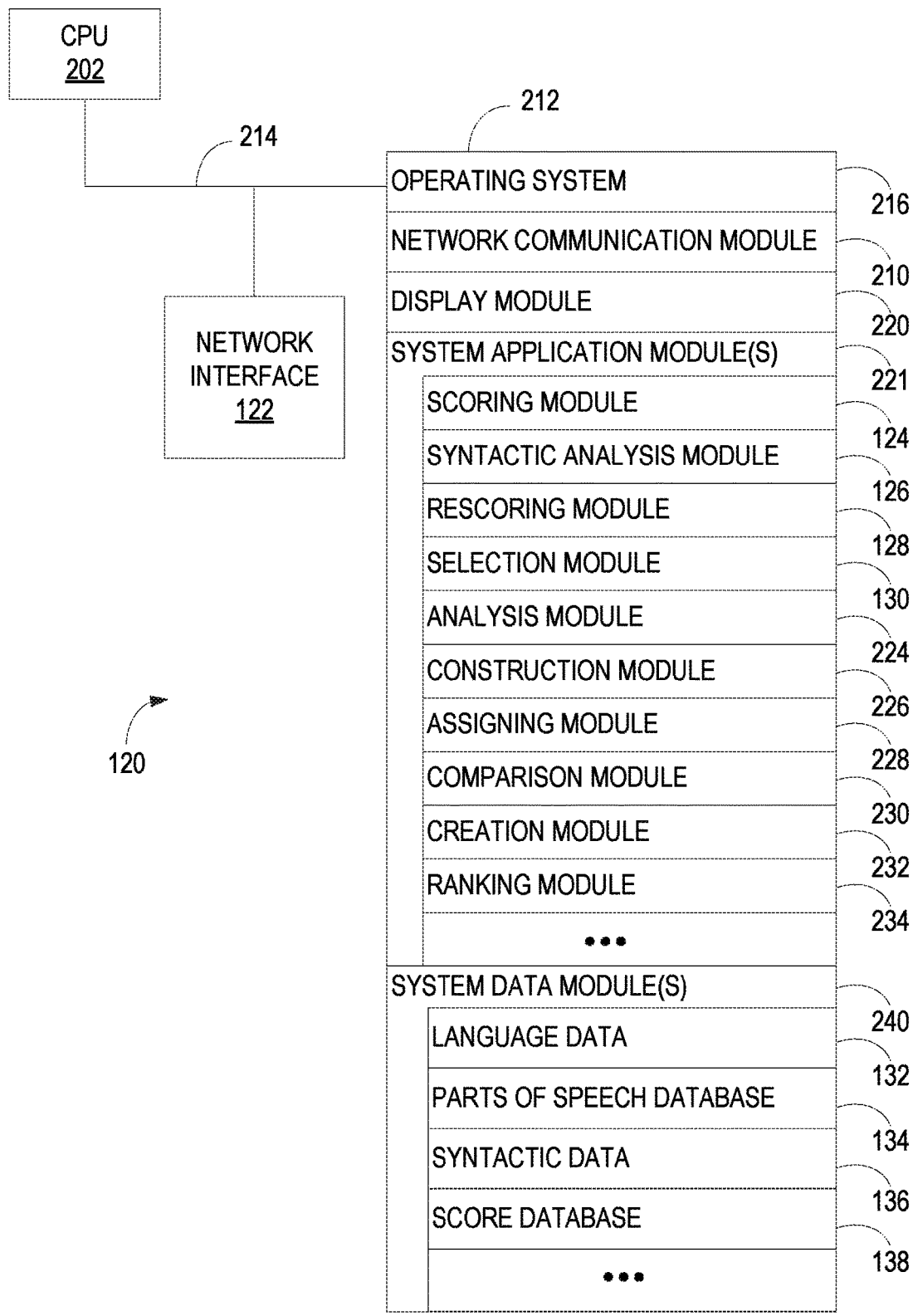
FIG. 2 is a block diagram further illustrating the computer system depicted in FIG. 1, in accordance with some example embodiments.

FIG. 2 is a block diagram further illustrating the computer system 120, in accordance with some example embodiments. The computer system 120 typically includes one or more processing units (CPUs) 202, one or more network interfaces 122, memory 212, and one or more communication buses 214 for interconnecting these components.

Memory 212 includes high-speed random access memory, such as Dynamic Random Access Memory (DRAM), Static Random Access Memory (SRAM), Double Data Rate Random Access Memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer-readable storage medium.

In some example embodiments, memory 212 or the computer-readable storage medium of memory 212 stores the following programs, modules, and data structures, or a subset thereof:

- an operating system 216 that includes procedures for handling various basic system services and for performing hardware dependent tasks;
- a network communication module 210 that is used for connecting the computer system 120 to other computers via the one or more network interface module(s) 122 (wired or wireless) and one or more communication networks (e.g., communication network 110), such as the Internet, other WANs, LANs, metropolitan area networks, etc.;
- a display module 220 for enabling the information generated by the operating system 216 to be presented visually as needed;
- one or more system application modules 221 for handling various aspects of storing and recovering data, including but not limited to:
  - a scoring module 124 for generating initial likelihood scores for a plurality of potential transcriptions based on the output of an acoustic model and a language model;
  - a syntactic analysis module 126 for analyzing a potential transcription by identifying one or more words, tagging those words as particular parts of speech (e.g., noun, verb, and so on) and building a syntactic structure for the particular potential transcription;
  - a rescoring module 128 for generating a syntactic likelihood that the particular potential transcription is correct based on the syntactic structure and rescoring the likelihood of particular transcription being correct by including the syntactic likelihood with the initial likelihood;
  - a selection module 130 for selecting a particular potential transcription from a plurality of potential transcriptions for a particular audio clip or sentence;
  - an analysis module 224 for identifying particular words and/or phrases within a potential transcription;
  - a construction module 226 for constructing a syntactic structure based on a potential transcription, wherein the syntactic structure includes relationship indications between different words and phrases within the transcription based at least in part on the syntactic tags for each word in the transcription;
  - an assigning module 228 for assigning a part of speech tag for each word and/or phrase in the potential transcription;
  - a comparison module 230 for comparing a constructed syntactic structure to predetermined syntactic structures;
  - a creation module 232 for creating an adjusted score based on an initial likelihood score and a syntactic likelihood score; and
  - a ranking module 234 for ranking a plurality of potential transcriptions based on their associated adjusted likelihood scores; and
- a system data module(s) 240 for storing data at the computer system 120, including but not limited to:
  - language data 132 for describing a large corpus of language text and the relationships that occur between the words and/or phrases in that text;
  - a parts of speech database 134 that includes a reference table or other data structure that takes a word or phrase as input and returns one or more part of speech tags associated with the input word or phrase;
  - syntactic data 136 including data that describes allowable syntactic patterns or rules for evaluating whether a given transcription is in accordance with expected syntactic construction; and
  - a score database 138 including, for a plurality of potential transcriptions, an initial likelihood score (based on acoustic modeling and language modeling), a syntactic likelihood score (based on the degree to which the potential transcriptions conform to syntactic norms), and an adjusted likelihood score that combines the initial likelihood score and the syntactic likelihood score.

Figure 3:
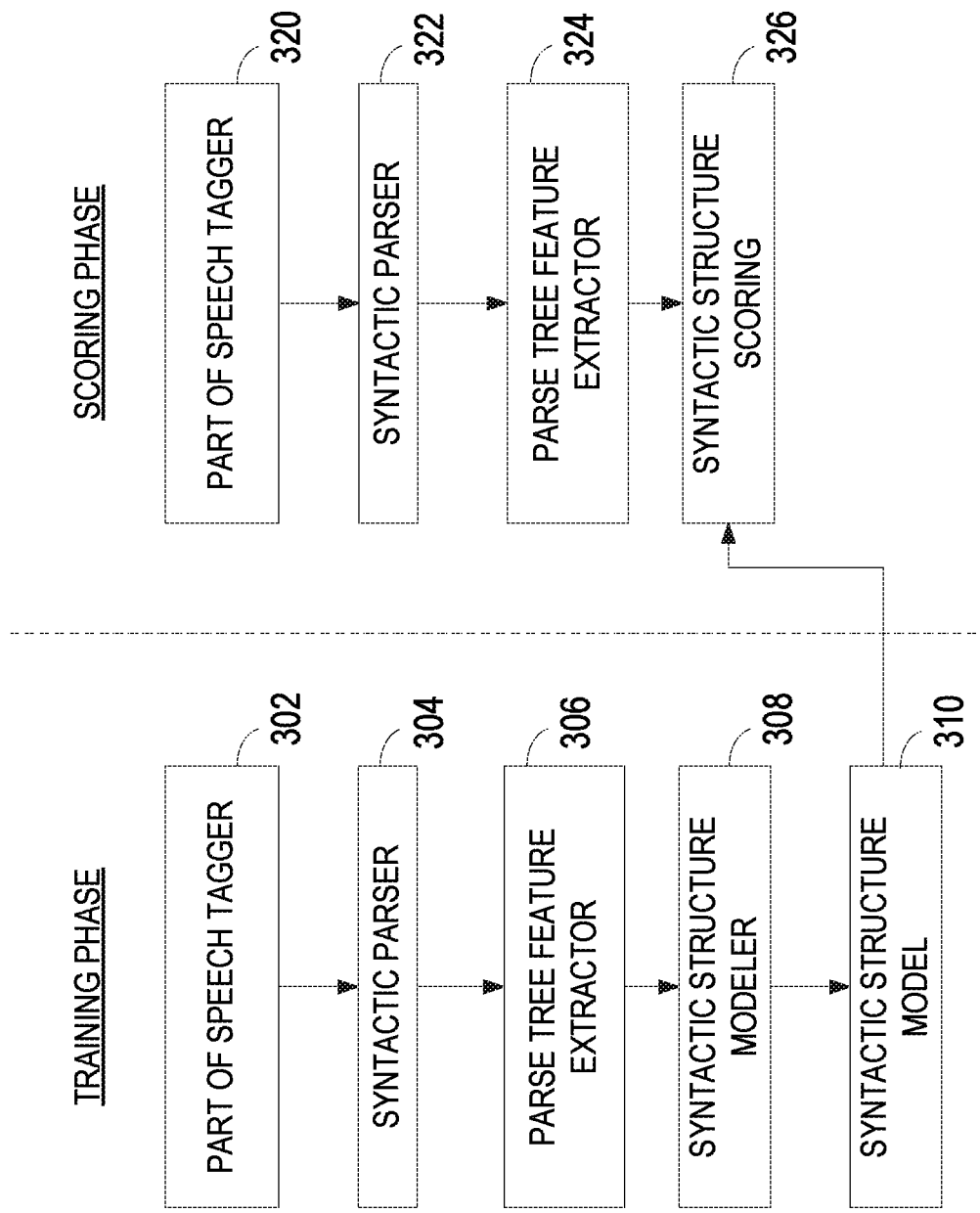
FIG. 3 shows a flow diagram of a method of training a syntactic structure model and using that model to score syntactic structures, in accordance with some example embodiments.

FIG. 3 shows a flow diagram of a method of training a syntactic structure model and using that model to score syntactic structures, in accordance with some example embodiments.

In some example embodiments, the computer system (e.g., the computer system 120 in FIG. 1) receives a plurality of potential transcriptions for a given audio file or audio data. Each potential transcription is the result of automatic speech recognition techniques including acoustic modeling and language modeling, but not syntactic analysis. In the training phase, the received potential transcriptions include manual annotation data which reflects the syntactic coherency of the potential transcription based on the judgment of one or more human judges.

The computer system (e.g., the computer system 120 in FIG. 1) then employs a part of speech tagger 302 to associate each word within the potential transcription with its associated part of speech tag. Such tagging is performed by an algorithm that statistically determines, based on existing language data, which part of speech each word is associated with. In some example embodiments, this algorithm may be as simple as a lookup table combined with context-based rules and information, and in other cases, a more complicated algorithm such as a Brill tagger may be used.

The computer system (e.g., the computer system 120 in FIG. 1) then uses a syntactic parser 304 to produce a syntactic parse tree for each potential transcription. In some example embodiments, the syntactic parse tree may employ a syntactic constituency tree and a syntactic dependency tree.

The computer system (e.g., the computer system 120 in FIG. 1) then uses a parse tree feature extractor 306 to extract features from each of the syntactic parse trees. The extracted features include, among others, node types, node types along with their relation types, the number of siblings per node, and so on.

In some example embodiments, the computer system (e.g., the computer system 120 in FIG. 1) then uses a syntactic structure modeler 308 to produce a model that estimates the syntactic coherency of a given potential transcription. In some example embodiments, the model is constructed using machine learning techniques such as a support vector machine or a neural network. In some example embodiments, the syntactic structure modeler 308 uses the features extracted by module 306 and the manual annotation data which reflects the syntactic coherency of each potential transcription in order to produce a model.

Once the syntactic structure model 310 is generated in the training phase, the model may be used for scoring actual potential transcriptions. In some example embodiments, the scoring phase is used for testing and to evaluate the accuracy of the model. At some point, the model is used to actually score potential transcriptions for use.

During the scoring phase, the computer system (e.g., the computer system 120 in FIG. 1) uses a part of speech tagger 320 to identify a part of speech, for each word in the potential transcription. This is accomplished using the same techniques as used in the training phase.

The computer system (e.g., the computer system 120 in FIG. 1) then uses a syntactic parser 322 to produce a syntactic parse tree for each potential transcription, in the same way as during the training phase. The parse tree feature extractor 324 extracts features from each of the syntactic parse trees.

The computer system (e.g., the computer system 120 in FIG. 1) then uses syntactic structure scoring 326 and the produced syntactic structure model 310 to produce a syntactic likelihood score (also called a syntactic coherency score). In some example embodiments, the score is a value between 0 and 1 where 0 is the lowest possible likelihood score and 1 is the highest possible likelihood score.

Figure 4A:
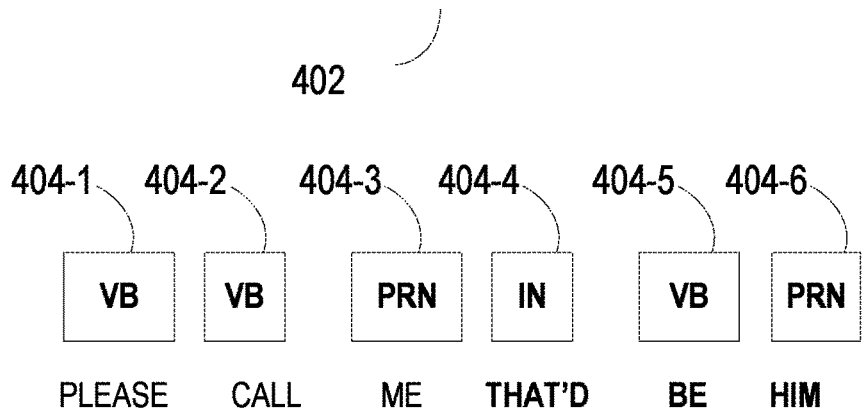
FIGS. 4A-4D are diagrams showing an example of a potential transcript being evaluated by the computer system.

FIG. 4A is a diagram showing an example of a potential transcript being evaluated by the computer system (e.g., the computer system 120 in FIG. 1). In this example, a first potential transcript (potential transcript 1 402), "Please Call Me That'd Be Him", is identified based on acoustic data.

In a first step, the computer system (e.g., the computer system 120 in FIG. 1) tags each word in potential transcript 1 402 with a parts of speech tag (wherein the parts of speech tag represents what role the word plays in the sentence/phrase). In this present example, the word "please" is marked as a verb 404-1, the word "call" is also tagged as a verb 404-2, the word "me" is tagged as a personal pronoun 404-3, the contraction "that'd" is tagged as an interjection 404-4, the word "be" is tagged as a verb 404-5, and the word "him" is tagged as a personal pronoun 404-6.

Figure 4B:
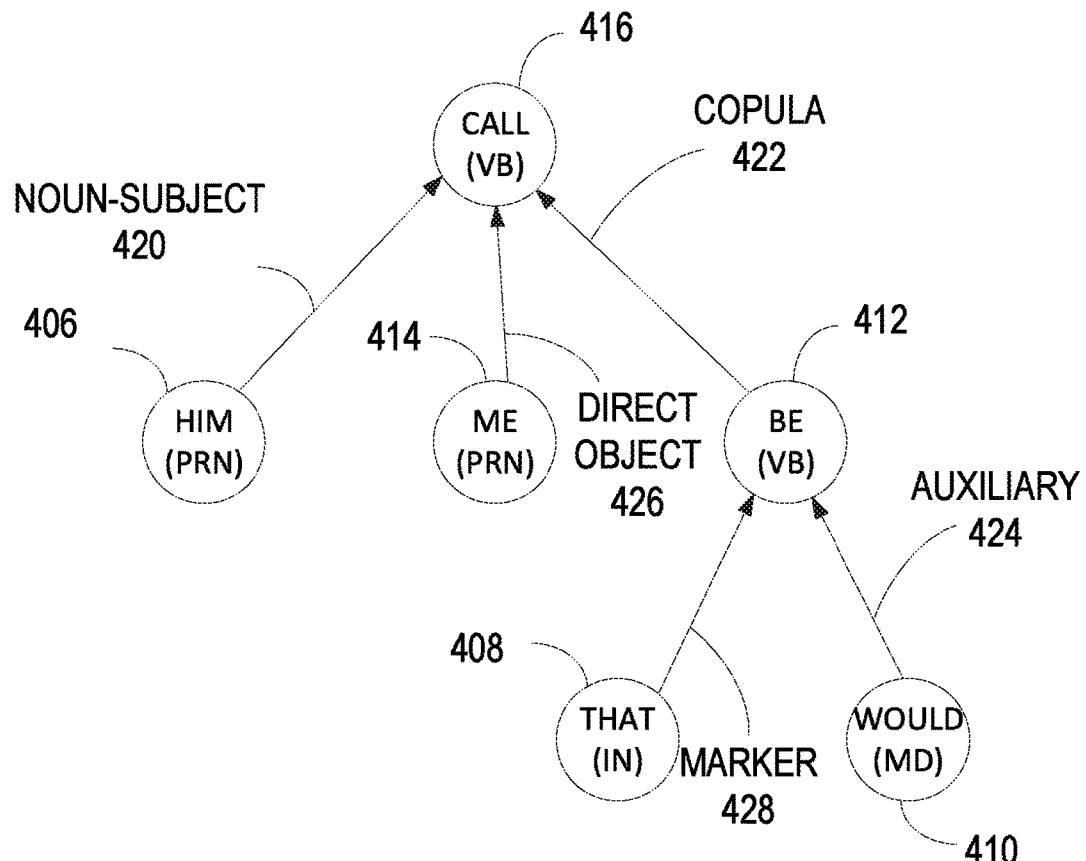

FIG. 4B is a diagram showing an example syntactic structure for the potential transcription 1 402. Each word is connected to another word in the sentence based on a relationship of the two words; the connection type is listed on the connecting arrow.

In this example, the verb "call" 416 is connected to the pronoun "him" 406 (which is listed as the noun-subject 420) and the pronoun "me" 414 which is listed as the direct object 426 of the verb "call" 416.

The verb "be" 412 is connected to the verb "call" 416 as a copula 422 (a copula is a connecting word that is generally a form of the verb "be"). The interjection "that" 408 is connected to the verb "be" 412 as a marker 428, and the modifier "would" 410 is connected to the verb "be" 412 as an auxiliary 424.

Figure 4C:
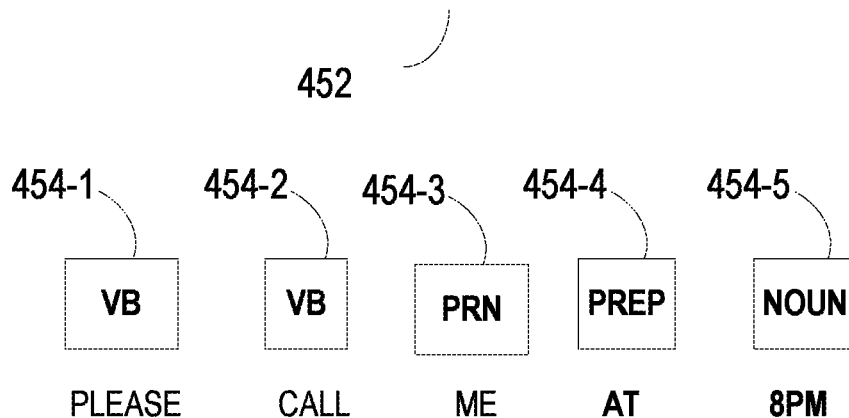

FIG. 4C is a diagram showing an example of a potential transcript being evaluated by the computer system (e.g., the computer system 120 in FIG. 1). In this example, a second potential transcript (potential transcript 2 452) is "Please Call Me At 8 PM", which is an alternative transcription to the potential transcript 1 402 in FIG. 4A. The potential transcript 2 452 "Please Call Me At 8 PM" is identified based on acoustic data.

As a first step, the computer system, e.g., computer system 120, generates a part of speech tag for each word. In this example, the word "please" is tagged as a verb 454-1, the word "call" is tagged as a verb 454-2, the word "me" is tagged as a personal pronoun 454-3, the word "at" is tagged as a preposition 454-4, and the phrase "8 PM" is tagged as a noun 454-5.

Figure 4D:
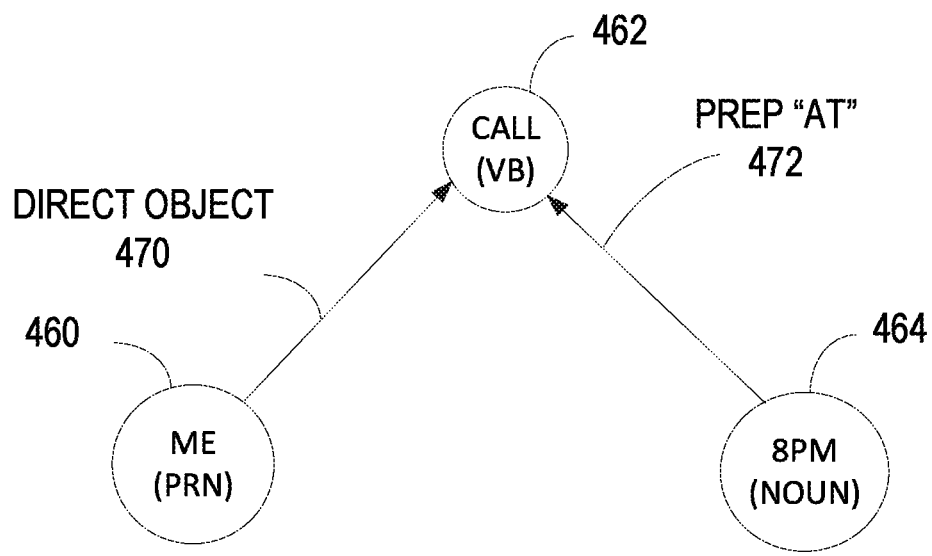

FIG. 4D is a diagram showing an example syntactic structure for the potential transcription 2 452. Each word is connected to another word in the sentence based on a relationship of the two words, and the connection type is listed on the connecting arrow.

In this example, the verb "call" 462 is connected to the pronoun "me" 460, which is listed as the direct object 470 of the verb "call" 462. The noun phrase "8 PM" 464 is connected to the verb "call" 462 by the preposition "at" 472.

In some example embodiments, the computer system then scores the syntactic structure for potential transcript 1 402 in FIGS. 4A and 4B and the syntactic structure for potential transcript 2 452 in FIGS. 4C and 4D. As noted above, a generated syntactic model uses the determined syntactic structure to generate a syntactic likelihood score.

In these examples, Potential Transcript 1 402 includes significant syntactic complexity/irregularity by including a copula 422, an auxiliary 424, a marker 428, and an interjection "that" 408. As a result, the syntactic likelihood as determined by the syntactic model is lower than the syntactic likelihood of potential transcript 2 452, which has much less syntactic irregularity/complexity.

Figure 5:
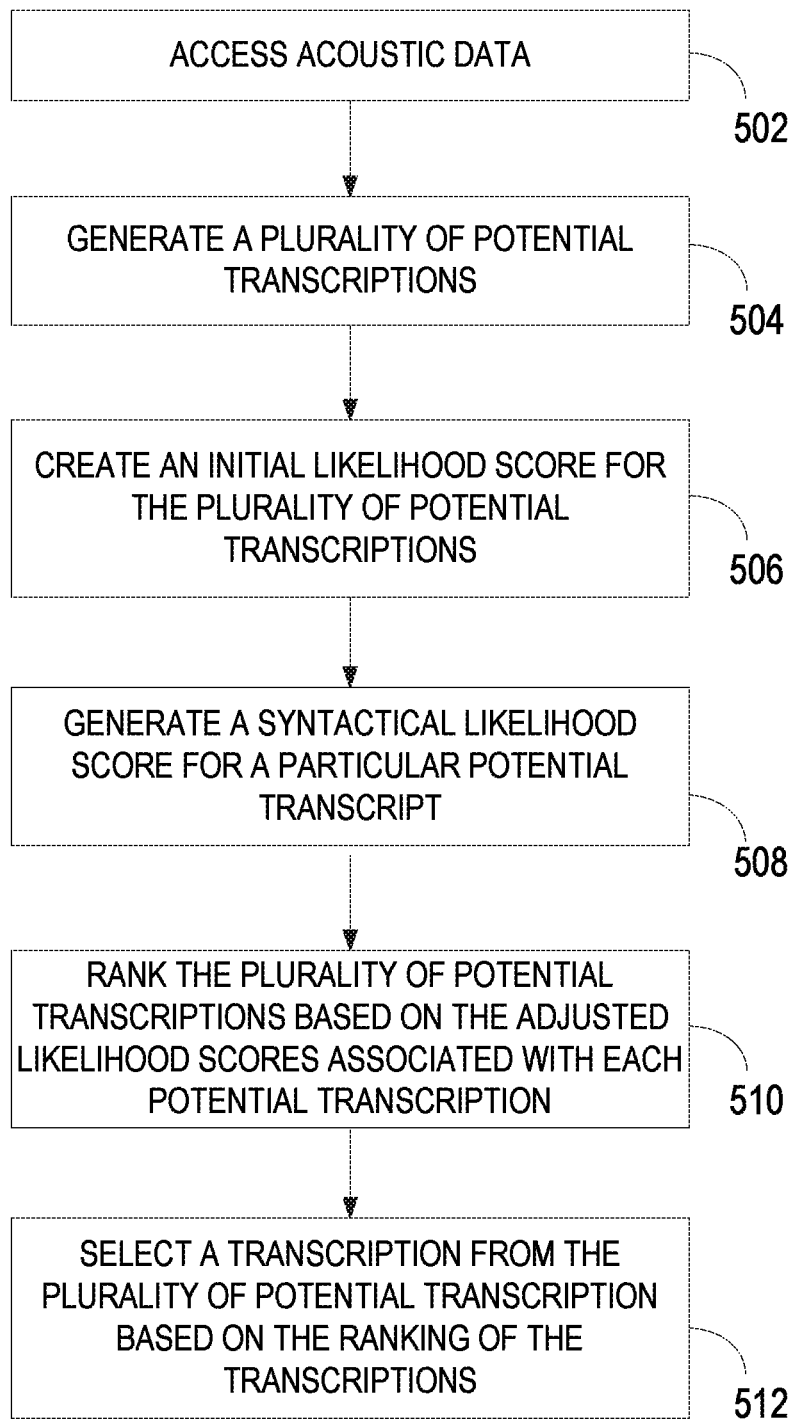
FIG. 5 shows a flow diagram of a method of using syntactic information to re-rank potential transcriptions, in accordance with some example embodiments.

FIG. 5 shows a flow diagram of a method of using syntactic information to re-rank potential transcriptions, in accordance with some example embodiments.

In some example embodiments, the computer system (e.g., the computer system 120 in FIG. 1) accesses (502) acoustic data for a recorded spoken language. The acoustic data is generally a recording of language spoken by a person and is associated with a particular language. In other example embodiments, the language is determined during analysis.

In some example embodiments, the computer system (e.g., the computer system 120 in FIG. 1) generates (504) a plurality of potential transcriptions for the acoustic data. In some example embodiments, generating potential transcriptions includes performing acoustic analysis of the sound data to match particular sounds (e.g., using a model) to words, syllables, and phrases in a particular language.

The computer system (e.g., the computer system 120 in FIG. 1) scores (506) the plurality of potential transcriptions to create an initial likelihood score for the plurality of potential transcriptions. In some example embodiments, the initial likelihood score is based at least partially on an acoustic analysis of the acoustic data. In some example embodiments, the initial likelihood score is based at least partially on analysis using a statistical word n-gram language model.

In some example embodiments, the computer system (e.g., the computer system 120 in FIG. 1) generates a syntactic coherency model using existing syntactic data.

For a particular potential transcription in the plurality of potential transcriptions, the computer system (e.g., the computer system 120 in FIG. 1) generates (508) a syntactical likelihood score for the particular potential transcript.

In some example embodiments, generating a syntactical likelihood score for the particular potential transcript includes a number of steps, including the computer system (e.g., the computer system 120 in FIG. 1) analyzing the particular potential transcript to identify a plurality of words and/or phrases in each potential transcript.

The computer system (e.g., the computer system 120 in FIG. 1) assigns a part of speech tag to an identified word in the plurality of words in the transcript.

The computer system (e.g., the computer system 120 in FIG. 1) constructs a syntactic parse tree for the particular potential transcript, based at least in part on the part of speech tags associated with the plurality of words in the particular potential transcript. The computer system (e.g., the computer system 120 in FIG. 1) extracts a plurality of syntactic features from the syntactic parse tree.

Using a syntactic coherency model, the computer system (e.g., the computer system 120 in FIG. 1) generates a syntactical likelihood score, wherein the syntactical likelihood score is based on the syntactical coherency of the particular potential transcript.

In some example embodiments, the computer system (e.g., the computer system 120 in FIG. 1) creates an adjusted score for a particular potential transcription by combining the initial likelihood score and the syntactic likelihood score for the particular potential transcription. In some example embodiments, the computer system (e.g., the computer system 120 in FIG. 1) has predetermined weights that it uses to combine the initial likelihood score with the syntactic likelihood score.

In some example embodiments, the computer system (e.g., the computer system 120 in FIG. 1) ranks (510) a plurality of potential transcriptions based on the adjusted likelihood scores associated with each potential transcription. The computer system (e.g., the computer system 120 in FIG. 1) selects (512) a transcription from the plurality of potential transcriptions based on the ranking of the plurality of potential transcriptions. This selected transcription is then used as the determined transcription.

Figure 6:
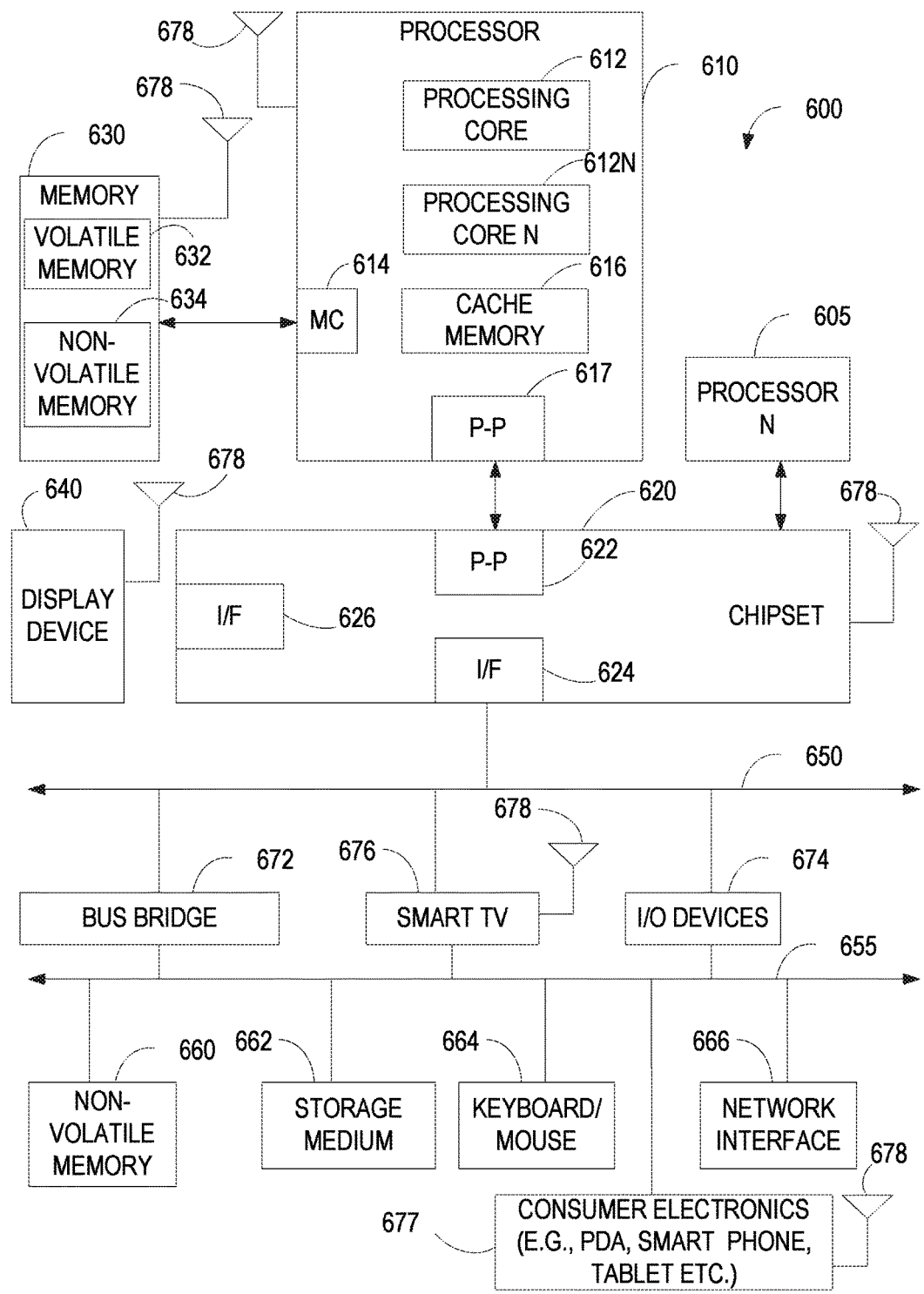
FIG. 6 illustrates a system level diagram, according to one example embodiment.

FIG. 6 illustrates a system level diagram, according to one example embodiment. For instance, FIG. 6 depicts an example of an electronic device (e.g., system) 600 as described in the present disclosure. FIG. 6 is included to show an example of a higher level device application. In one embodiment, the system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 is a system on a chip (SOC) system.

In one embodiment, processor 610 has one or more processing cores 612 and 612N, where 612N represents the nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions, and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, the wireless antenna 678 operates in accordance with, but is not limited to, the IEEE 802.11 standard and its related family, Home Plug AV (HPAV), Ultra-Wide Band (UWB), Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processors 610, 605N, display device 640, and other devices 672, 676, 674, 660, 662, 664, 666, 677, and so forth. Chipset 620 may also be coupled to a wireless antenna 678 to communicate with any device configured to transmit and/or receive wireless signals.

Chipset 620 connects to display device 640 via interface 626. Display device 640 may be, for example, a liquid crystal display (LCD), a plasma display, cathode ray tube (CRT) display, or any other form of visual display device. In some embodiments, processor 610 and chipset 620 are merged into a single SOC. In addition, chipset 620 connects to one or more buses 650 and 655 that interconnect various elements 674, 660, 662, 664, and 666. Buses 650 and 655 may be interconnected together via a bus bridge 672. In one embodiment, chipset 620 couples with a non-volatile memory 660, mass storage device(s) 662, keyboard/mouse 664, and network interface 666 via interface 624 and/or 624, smart television 676, consumer electronics 677, and so forth.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, HPAV, UWB, Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) may be incorporated into processing core 612.

Additional Notes & Examples

Example 1 is a system for syntactic re-ranking in automatic speech recognition, the system comprising: a computer-readable memory storing computer-executable instructions that, when executed by one or more hardware processors, configure the system to: access acoustic data for a recorded spoken language; generate a plurality of potential transcriptions for the acoustic data; score the plurality of potential transcriptions to create an initial likelihood score for the plurality of potential transcriptions; and for a particular potential transcription in the plurality of transcriptions: generate a syntactic likelihood score for the particular potential transcription; and create an adjusted score for the particular potential transcription by combining the initial likelihood score and the syntactic likelihood score for the particular potential transcription.

In Example 2, the subject matter of Example 1 optionally includes instructions to rank the plurality of potential transcriptions based on adjusted likelihood scores associated with each potential transcription.

In Example 3, the subject matter of Example 2 optionally includes instructions to select a transcription from the plurality of potential transcriptions based on the ranking of the plurality of potential transcriptions.

In Example 4, the subject matter of any one or more of Examples 1-3 optionally include wherein the instructions to generate the syntactic likelihood score for the particular potential transcription further comprise instructions to, for the particular potential transcription: analyze the particular potential transcription to identify a plurality of words in the transcription; and assign a part of speech tag to an identified word in the plurality of words in the transcript.

In Example 5, the subject matter of Example 4 optionally includes instructions to, for the particular potential transcription: construct a syntactic parse tree for the particular potential transcription, based at least in part on part of speech tags associated with the plurality of words in the particular potential transcription.

In Example 6, the subject matter of Example 5 optionally includes instructions to, for the particular potential transcription: extract a plurality of syntactic features from the syntactic parse tree; and use a syntactic coherency model, generate a syntactic likelihood score, wherein the syntactic likelihood score is based on syntactic coherency of the particular potential transcription.

Example 7 is a method for syntactic re-ranking in automatic speech recognition, the method comprising: at a computer system with one or more processors: accessing acoustic data for a recorded spoken language; generating a plurality of potential transcriptions for the acoustic data; scoring the plurality of potential transcriptions to create an initial likelihood score for the plurality of potential transcriptions; and for a particular potential transcription in the plurality of potential transcriptions: generating a syntactic likelihood score for the particular potential transcription; and creating an adjusted score for the particular potential transcription by combining the initial likelihood score and the syntactic likelihood score for the particular potential transcription.

In Example 8, the subject matter of Example 7 optionally includes ranking the plurality of potential transcriptions based on adjusted likelihood scores associated with each potential transcription.

In Example 9, the subject matter of Example 8 optionally includes selecting a potential transcription from the plurality of potential transcriptions based on the ranking of the plurality of potential transcriptions.

In Example 10, the subject matter of any one or more of Examples 7-9 optionally include wherein generating a syntactic likelihood score for the particular potential transcription further comprises, for the particular potential transcription: analyzing the particular potential transcription to identify a plurality of words in the transcription; and assigning a part of speech tag to an identified word in the plurality of words in the transcription.

In Example 11, the subject matter of Example 10 optionally includes for the particular potential transcription: constructing a syntactic parse tree for the particular potential transcription, based at least in part on part of speech tags associated with the plurality of words in the particular potential transcription.

In Example 12, the subject matter of Example 11 optionally includes for a particular potential transcription: extracting a plurality of syntactic features from the syntactic parse tree; and using a syntactic coherency model, generating a syntactic likelihood score, wherein the syntactic likelihood score is based on syntactic coherency of the particular potential transcription.

In Example 13, the subject matter of any one or more of Examples 7-12 optionally include wherein the initial likelihood score is based at least partially on an acoustic analysis of the acoustic data.

In Example 14, the subject matter of any one or more of Examples 7-13 optionally include wherein the initial likelihood score is based at least partially on analysis using a statistical word n-gram language model.

In Example 15, the subject matter of any one or more of Examples 7-14 optionally include prior to generating a syntactic likelihood score for the particular potential transcription, generating a syntactic coherency model using existing syntactic data.

Example 16 is at least one computer-readable medium comprising instructions to perform any of the methods of Examples 7-15.

Example 17 is an apparatus comprising means for performing any of the methods of Examples 7-15.

Example 18 is an apparatus for syntactic re-ranking in automatic speech recognition, the apparatus comprising: means for accessing acoustic data for recorded spoken language; means for generating a plurality of potential transcriptions for the acoustic data; means for scoring the plurality of a plurality of potential transcriptions to create an initial likelihood score for the plurality of potential transcriptions; for a particular potential transcription in the plurality of transcriptions: means for generating a syntactical likelihood score for the particular potential transcript; and means for creating an adjusted score for a particular potential transcription by combining the initial likelihood score and the syntactic likelihood score for the particular potential transcription.

In Example 19, the subject matter of Example 18 optionally includes means for ranking a plurality of potential transcriptions based on the adjusted likelihood scores associated with each potential transcription.

In Example 20, the subject matter of Example 19 optionally includes means for selecting a potential transcription from the plurality of potential transcription based on the ranking of the plurality of potential transcriptions.

In Example 21, the subject matter of any one or more of Examples 18-20 optionally include wherein means for generating a syntactical likelihood score for the particular potential transcript further comprises: means for analyzing a particle potential transcript to identify a plurality of words in the transcript; and means for assigning a part of speech tag to an identified word in the plurality of words in the transcript.

In Example 22, the subject matter of Example 21 optionally includes means for constructing a syntactic parse tree for the particular potential transcript, based at least in part on the part of speech tags associated with the plurality of words in the particular potential transcript.

In Example 23, the subject matter of Example 22 optionally includes means for extracting a plurality of syntactic features from the syntactic parse tree; and means for using a syntactic coherency model, generating a syntactical likelihood score, wherein the syntactical likelihood score is based on the syntactical coherency of the particular potential transcript.

In Example 24, the subject matter of any one or more of Examples 18-23 optionally include wherein the initial likelihood score is based at least partially on an acoustic analysis of the acoustic data.

In Example 25, the subject matter of any one or more of Examples 18-24 optionally include wherein the initial likelihood score is based at least partially on analysis using a statistical word n-gram language model.

In Example 26, the subject matter of any one or more of Examples 18-25 optionally include means for, prior to generating a syntactical likelihood score for the particular potential transcript, generating a syntactic coherency model using existing syntactic data.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A system for syntactic re-ranking in automatic speech recognition, the system comprising:
   a computer-readable memory storing computer-executable instructions that, when executed by one or more hardware processors, configure the system to:
   access acoustic data for a recorded spoken language;
   generate a plurality of potential transcriptions for the acoustic data;
   score the plurality of potential transcriptions to create an initial likelihood score for the plurality of potential transcriptions; and
   for each particular potential transcription in the plurality of transcriptions:
      generate a syntactic likelihood score for the particular potential transcription, wherein the syntactic likelihood score is generated by evaluation of a syntactic structure for the particular potential transcription, and wherein the syntactic structure includes relationships between words included in the particular potential transcription; and
      create an adjusted score for the particular potential transcription by combining the initial likelihood score and the syntactic likelihood score for the particular potential transcription;
   generate a reduced plurality of transcriptions through elimination of one or more particular potential transcripts based on respective adjusted scores of the one or more particular potential transcripts indicating the unlikelihood of the one or more particular potential transcripts; and
   output a transcription from the reduced plurality of transcriptions based on the adjusted score of the transcription of the reduced plurality of transcriptions being greater than adjusted scores of other members of the reduced plurality of transcriptions.

2. The system of claim 1, further comprising instructions to rank the plurality of potential transcriptions based on adjusted likelihood scores associated with each potential transcription.

3. The system of claim 2, further comprising instructions to select a transcription from the plurality of potential transcriptions based on the ranking of the plurality of potential transcriptions.

4. The system of claim 1, wherein the instructions to generate the syntactic likelihood score for the particular potential transcription further comprise instructions to, for particular potential transcription:
   analyze the particular potential transcription to identify a plurality of words in the transcription; and
   assign a part of speech tag to an identified word in the plurality of words in the transcript.

5. The system of claim 4, further comprising instructions to, for the particular potential transcription:
   construct a syntactic parse tree for the particular potential transcription, based at least in part on part of speech tags associated with the plurality of words in the particular potential transcription.

6. The system of claim 5, further comprising instructions to, for the particular potential transcription:
   extract a plurality of syntactic features from the syntactic parse tree; and
   use a syntactic coherency model, generate a syntactic likelihood score,
   wherein the syntactic likelihood score is based on syntactic coherency of the particular potential transcription.

7. A method for syntactic re-ranking in automatic speech recognition, the method comprising:
   at a computer system with one or more processors:
      accessing acoustic data for a recorded spoken language;
      generating a plurality of potential transcriptions for the acoustic data;
      scoring the plurality of potential transcriptions to create an initial likelihood score for the plurality of potential transcriptions; and
      for each particular potential transcription in the plurality of potential transcriptions:
         generating a syntactic likelihood score for the particular potential transcription, wherein generating the syntactic likelihood score includes evaluating a syntactic structure for the particular potential transcription, and wherein the syntactic structure includes relationships between words included in the particular potential transcription; and
         creating an adjusted score for the particular potential transcription by combining the initial likelihood score and the syntactic likelihood score for the particular potential transcription;
      generating a reduced plurality of transcriptions through elimination of one or more particular potential transcripts based on respective adjusted scores of the one or more particular potential transcripts indicating the unlikelihood of the one or more particular potential transcripts; and
      outputting a transcription from the reduced plurality of transcriptions based on the adjusted score of the transcription of the reduced plurality of transcriptions being greater than adjusted scores of other members of the reduced plurality of transcriptions.

8. The method of claim 7, further comprising:
   ranking the plurality of potential transcriptions based on adjusted likelihood scores associated with each potential transcription.

9. The method of claim 8, further comprising selecting a potential transcription from the plurality of potential transcriptions based on the ranking of the plurality of potential transcriptions.

10. The method of 7, wherein generating a syntactic likelihood score for the particular potential transcription further comprises, for the particular potential transcription:
analyzing the particular potential transcription to identify a plurality of words in the transcription; and
assigning a part of speech tag to an identified work in the plurality of words in the transcription.

11. The method of claim 10, further comprising, for the particular potential transcription:
constructing a syntactic parse tree for the particular potential transcription, based at least in part on part of speech tags associated with the plurality of words in the particular potential transcription.

12. The method of claim 11, further comprising, for a particular potential transcription:
extracting a plurality of syntactic features from the syntactic parse tree; and
using a syntactic coherency model, generating a syntactic likelihood score,
wherein the syntactic likelihood score is based on syntactic coherency of the particular potential transcription.

13. The method of claim 7, wherein the initial likelihood score is based at east partially on an acoustic analysis of the acoustic data.

14. The method of claim 7, wherein the initial likelihood score is based at least partially on analysis using a statistical word n-gram language model.

15. The method of claim 7, further comprising, prior to generating a syntactic likelihood score for the particular potential transcription, generating a syntactic coherency model using existing syntactic data.

16. At least one non-transitory computer-readable storage medium storing instructions that, when executed by the one or more processors of a machine, cause the machine to:
access acoustic data for a recorded spoken language;
generate a plurality of potential transcriptions for the acoustic data;
score the plurality of potential transcriptions to create an initial likelihood score for the plurality of potential transcriptions; and
for each particular potential transcription in the plurality of transcriptions:
generate a syntactic likelihood score for the particular potential transcription, wherein the syntactic likelihood score is generated by evaluation of a syntactic structure for the particular potential transcription, and wherein the syntactic structure includes relationships between words included in the particular potential transcription; and
create an adjusted score for the particular potential transcription by combining the initial likelihood score and the syntactic likelihood score for the particular potential transcription;
generate a reduced plurality of transcriptions through elimination of one more particular potential transcripts based on respective adjusted scores of the one or more particular potential transcripts indicating the unlikelihood of the one or more particular potential transcripts; and
output a transcription of the reduced plurality of transcriptions based on the adjusted score of the transcription of the reduced plurality of transcriptions being greater than adjusted scores of other members of the reduced plurality of transcriptions.

17. The computer-readable storage medium of claim 16, the instructions further comprising instructions to:
rank the plurality of potential transcriptions based on adjusted likelihood scores associated with each potential transcription.

18. The computer-readable storage medium of claim 17, the instructions further comprising instructions to:
select a transcription from the plurality of potential transcriptions based on the ranking of the plurality of potential transcriptions.

19. The computer-readable storage medium of claim 16, wherein the instructions to generate the syntactic likelihood score for the particular potential transcription further comprise instructions to, for the particular potential transcription:
analyze the particular potential transcription to identify a plurality of words in the transcription; and
assign a part of speech tag to an identified word in the plurality of words in the transcription.

20. The computer-readable storage medium of claim 19, the instructions further comprising instructions to, for the particular potential transcription:
construct a syntactic parse tree for the particular potential transcription, based at least in part on part of speech tags associated with the plurality of words in the particular potential transcription.

* * * * *

UNITED STATES PATENT AND TRADEMARK OFFICE
CERTIFICATE OF CORRECTION

PATENT NO. : 10,242,670 B2
APPLICATION NO. : 15/272078
DATED : March 26, 2019
INVENTOR(S) : Pereg et al.

Page 1 of 1

It is certified that error appears in the above-identified patent and that said Letters Patent is hereby corrected as shown below:

In the Claims

In Column 16, Line 8, in Claim 4, before "particular", insert --the--

In Column 17, Line 5, in Claim 10, delete "of 7," and insert --of claim 7,-- therefor In Column 17, Line 10, in Claim 10, delete "work" and insert --word-- therefor In Column 17, Line 28, in Claim 13, delete "east" and insert --least-- therefor In Column 18, Line 11, in Claim 16, after "one", insert --or--

Signed and Sealed this
Fourth Day of January, 2022

Drew Hirshfeld
*Performing the Functions and Duties of the
Under Secretary of Commerce for Intellectual Property and
Director of the United States Patent and Trademark Office*